US010390526B1

(12) United States Patent
Vandervort

(10) Patent No.: US 10,390,526 B1
(45) Date of Patent: Aug. 27, 2019

(54) COLLAPSIBLE SWIM-THROUGH TRAP

(71) Applicant: Bruce Vandervort, Humptulips, WA (US)

(72) Inventor: Bruce Vandervort, Humptulips, WA (US)

( * ) Notice: Subject to any disclaimer, the term of this patent is extended or adjusted under 35 U.S.C. 154(b) by 374 days.

(21) Appl. No.: 15/293,595

(22) Filed: Oct. 14, 2016

(51) Int. Cl.
A01M 23/18 (2006.01)

(52) U.S. Cl.
CPC .................................. A01M 23/18 (2013.01)

(58) Field of Classification Search
CPC ...... A01M 23/00; A01M 23/16; A01M 23/18; A01M 23/20
USPC ...................................................... 43/60, 61
See application file for complete search history.

(56) References Cited

U.S. PATENT DOCUMENTS

| 2,725,661 | A |   | 12/1955 | Bowman |  |
|---|---|---|---|---|---|
| 3,800,463 | A | * | 4/1974 | Treadwell | A01M 23/28 43/97 |
| 3,913,258 | A |   | 10/1975 | Souza et al. |  |
| 4,458,394 | A | * | 7/1984 | Schultz | A01M 23/26 24/337 |
| 4,912,872 | A | * | 4/1990 | Wynn | A01M 23/18 43/60 |
| 5,329,723 | A | * | 7/1994 | Liul | A01M 23/18 43/61 |
| 5,778,594 | A |   | 7/1998 | Askins et al. |  |
| 5,862,624 | A | * | 1/1999 | Askins | A01M 23/18 43/58 |
| 6,618,982 | B2 | * | 9/2003 | Lafforthun | A01M 23/02 43/58 |
| 6,658,788 | B1 |   | 12/2003 | Steinfest |  |
| 6,834,460 | B1 | * | 12/2004 | Liu | A01M 23/18 43/61 |
| 8,407,931 | B1 | * | 4/2013 | Humphrey | A01M 23/24 43/61 |
| 8,627,595 | B2 |   | 1/2014 | Radesky et al. |  |
| 9,204,627 | B1 | * | 12/2015 | Comstock | A01M 23/18 |
| 9,661,839 | B2 | * | 5/2017 | Zhu | A01M 23/08 |
| 9,717,229 | B2 | * | 8/2017 | Rich | A01M 23/24 |

(Continued)

FOREIGN PATENT DOCUMENTS

| GB | 347385 A | * | 4/1931 | ............ A01M 23/18 |
| WO | WO9506406 |   | 3/1995 |  |

(Continued)

Primary Examiner — Magdalena Topolski
Assistant Examiner — Morgan T Barlow
(74) Attorney, Agent, or Firm — Goldstein Law Offices, P.C.

(57) ABSTRACT

A collapsible swim-through trap having a cage body, a position lock mechanism, a release mechanism, and two setting hooks, the cage body having a front opening, a rear opening, and four walls extending between those openings. Each of the openings is equipped with a door which opens inwardly. There is a position lock mechanism used to secure the trap in an upright position which may be disengaged when a user wants to collapse the trap. The release mechanism includes a trigger, and an interfaced door retaining bar for holding the two doors in an open position. Upon pushing the trigger, the door retaining bar will rotate and release the two doors, trapping whatever is inside the cage body within the trap. The two setting hooks are used to hold the doors back while the door retaining bar is rotated into position.

11 Claims, 14 Drawing Sheets

(56) References Cited

U.S. PATENT DOCUMENTS

| | | | |
|---|---|---|---|
| 2009/0094882 A1 | 4/2009 | Comstock | |
| 2009/0211146 A1* | 8/2009 | Radesky | A01M 23/18 43/61 |
| 2010/0115823 A1* | 5/2010 | Watson | A01M 23/18 43/61 |
| 2014/0298710 A1* | 10/2014 | Pomerantz | A01M 23/18 43/61 |
| 2015/0245603 A1* | 9/2015 | Marks | H05K 999/99 43/61 |
| 2016/0135444 A1* | 5/2016 | Pomerantz | A01M 23/18 43/61 |
| 2017/0000105 A1* | 1/2017 | Ziegmann | A01M 23/18 |
| 2017/0112119 A1* | 4/2017 | Novatney | A01M 23/18 |

FOREIGN PATENT DOCUMENTS

| | | | | |
|---|---|---|---|---|
| WO | WO-9506406 A1 * | 3/1995 | | A01M 23/18 |
| WO | WO2007080233 | 7/2007 | | |

* cited by examiner

COLLAPSIBLE SWIM-THROUGH TRAP

TECHNICAL FIELD

The present disclosure relates generally to a collapsible swim-through trap. More particularly, the present disclosure relates to a collapsible swim-through trap that can be collapsed and reassembled without any tools, is triggered by the trigger being pushed, is suitable for land and water use, and is durable enough for repeated use.

BACKGROUND

Successfully using traps to capture wild animals requires a combination of proper equipment as well as intuition as to where to set the trap. Many aspects of a trap's design have an impact on its ability to be transported to the desired location, being triggered at the appropriate moments, and the durability of the trap to be used repeatedly. Among these aspects are the material the trap is constructed out of and the nature of the trigger employed. Also important, and frequently overlooked, is the mechanism used to collapse and expand the trap, as well as the mechanism used to set the trap.

While collapsible traps are not new, many of the existing traps today are cumbersome to set up and take down, and are often too flimsy to be used more than a handful of times. Further, many of the collapsible traps require some assembly in the field, or require the use of tools to setup. The use of tools is not desirable because it opens up the possibility that a user will trek out into the field to set some traps and arrive at their destination only to find that they forgot the tools needed to set up the trap.

Many traps employ a trigger that must be stepped on by an animal to spring the trap. These types of triggers have a number of drawbacks as animals that do not weigh enough will step on the trigger without setting it off, and those traps are limited to use with land. A trap with a trigger that needs to be pushed instead of stepped on would allow a user to set the trap in a body of water, for example.

Moreover, many traps used today have doors that open away from the interior of the trap. This is not ideal as objects outside of the trap can interfere with the springing of said trap. Additionally, doors that open outwards require an additional component; a door locking device, which is not needed on traps that have doors that open inwardly. Accordingly, there is a need for a trap that can be easily collapsed and set up without the use of tools, that is sturdy, easily portable, has doors that open inwardly, and that has a trigger that is not engaged by being stepped on.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a double-door trap with a trigger that need not be stepped on. Accordingly, the present disclosure provides a collapsible swim-through trap with a conibear-type trigger having two doors.

Another aspect of an example embodiment in the present disclosure is to produce a collapsible swim-through trap that can be easily collapsed and set up in the field. Accordingly, the collapsible swim-through trap according to the present disclosure is capable of being collapsed and setup without the use of any tools.

Yet another aspect of an example embodiment in the present disclosure is to provide a trap that will not have its operation interfered with by objects proximate to the trap. Accordingly, the first door and second door of the collapsible swim-through trap open inwardly.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
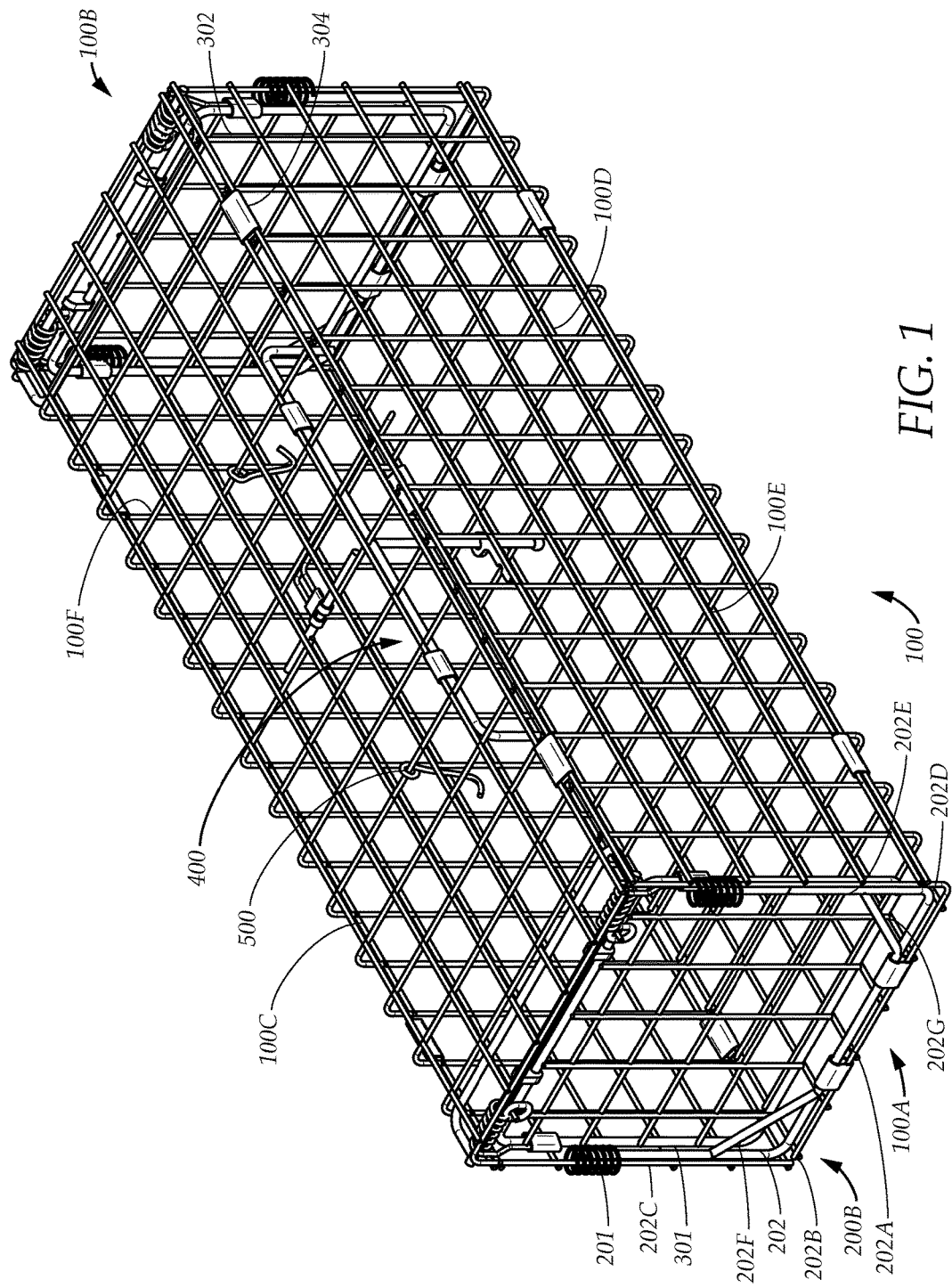
FIG. 1 is a perspective view showing an example embodiment of the collapsible swim-through trap, per se.

FIG. 1 illustrates a collapsible swim-through trap in accordance with the present disclosure, the trap having a cage body 100, a position lock mechanism 200, a first door 301, a second door 302, a release mechanism 400, and a plurality of setting hooks 500. The cage body 100 has a front opening 100A, a rear opening 100B. The cage body 100 also has a left wall 100C, a right wall 100D, a bottom wall 100E, and a top wall 100F that all extend between the front opening 100A and the rear opening 100B. The left wall 100C and the right wall 100D are each rotatably attached to the bottom wall 100E, and the top wall 100F via a plurality of body hinges 304. The front opening 100A includes a first door 301 rotatably attached to the top wall 100F and the rear opening 100B includes a second door 302 rotatably attached to the top wall 100F. Preferably, the first door 301 and the second door 302 swing inwardly. Both the first door 301 and the second door 302 are equipped with a plurality of torsion springs 304.

The front opening 100A and the rear opening 100B are each equipped with their own position lock mechanism 200. Each position lock mechanism 200 includes two position locks 201 and a position lock bar 202. The position lock bar 202 comprises a horizontal portion 202A having a left end 202B and a right end 20D. Extending outwardly from the left end 202B at an angle perpendicular to the horizontal portion 202A is a first vertical portion 202C. Extending outwardly from the right end 202D at an angle perpendicular to the horizontal portion 202A is a second vertical portion 202C. Additionally, each of the position lock bars 202 includes a first brace 202F extending diagonally from the horizontal portion 202A to the first vertical portion 202C as well as a second brace 202G extending diagonally from the horizontal portion 202A to the second vertical portion 202E.

The first door 301 and the second door 302 employ the plurality of torsion springs 303 to create a spring-bias such that the first door 301 will abut against the first brace 202F and the second brace 202G of one position lock mechanism 200 and the second door 302 will abut against the first brace 202F and the second brace 202G of a second position lock mechanism 200.

Figure 2:
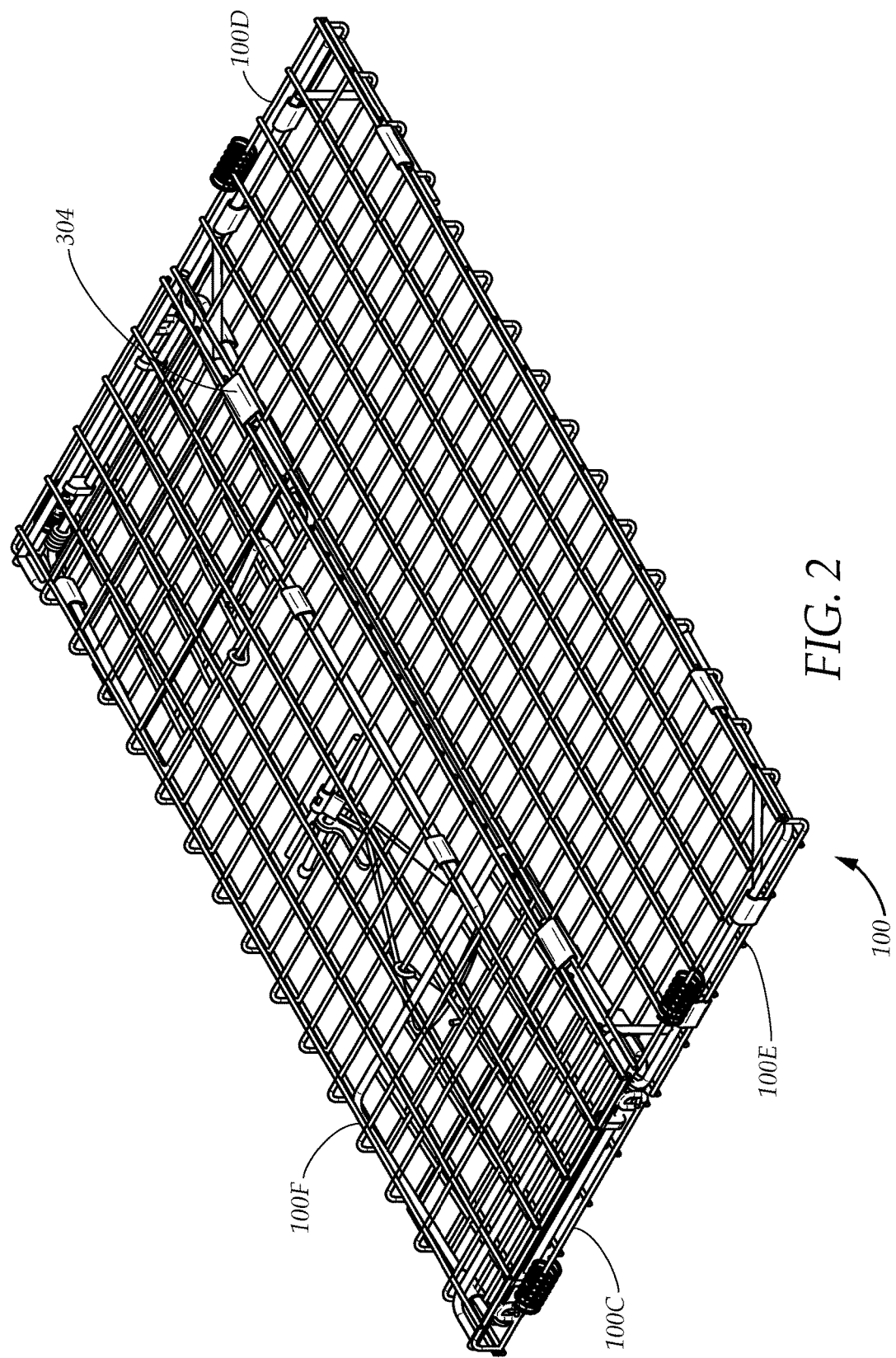
FIG. 2 is a perspective view showing an example embodiment of the collapsible swim-through trap, wherein the trap is in a collapsed position.

FIG. 2 shows a collapsible swim-through trap according to the present disclosure in a collapsed position. To be clear, said trap is in the closed position when the cage body 100 is manipulated such that the left wall 100C is pressed against the top wall 100F or the bottom wall 100E. When the cage body 100 is in the collapsed position and the left wall 100C is pressed against the top wall 100F, the bottom wall 100E will be pressed against the right wall 100D. When the left wall 100C is pressed against the bottom wall 100E, the right wall 100D is pressed against the top wall 100F. The plurality of body hinges 304, which join the left wall 100C, the right wall 100D, the bottom wall 100E, and the top wall 100F, allow for this movement. The collapsed position is beneficial because it allows a user to more easily transport the collapsible swim-through trap according to the present disclosure and provides for reduced shipping costs when being shipped commercially.

Figure 4:
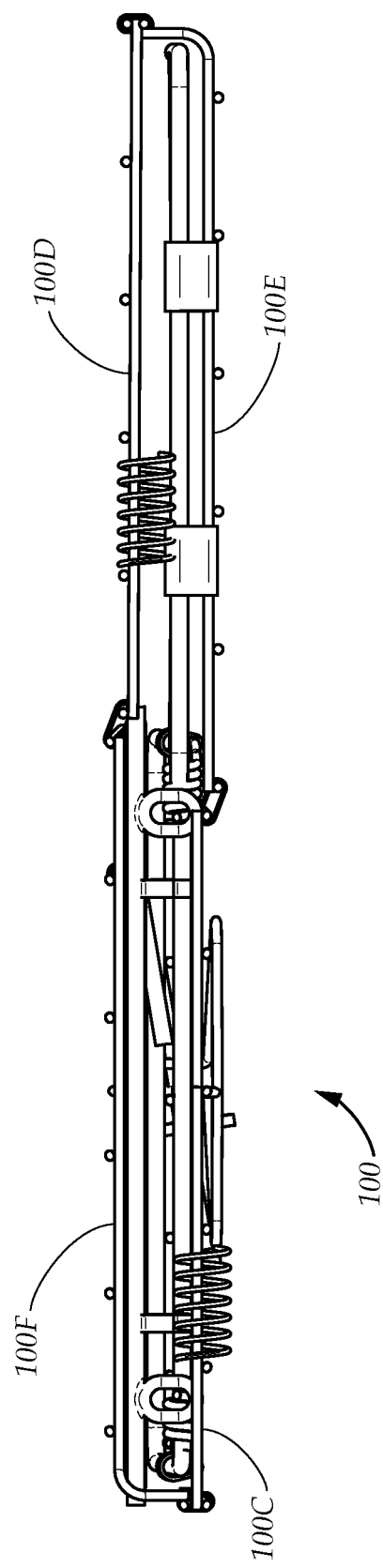
FIG. 4 is a side elevational view showing an example embodiment of the collapsible swim-through trap, wherein the trap is in the collapsed position.
Figure 5:
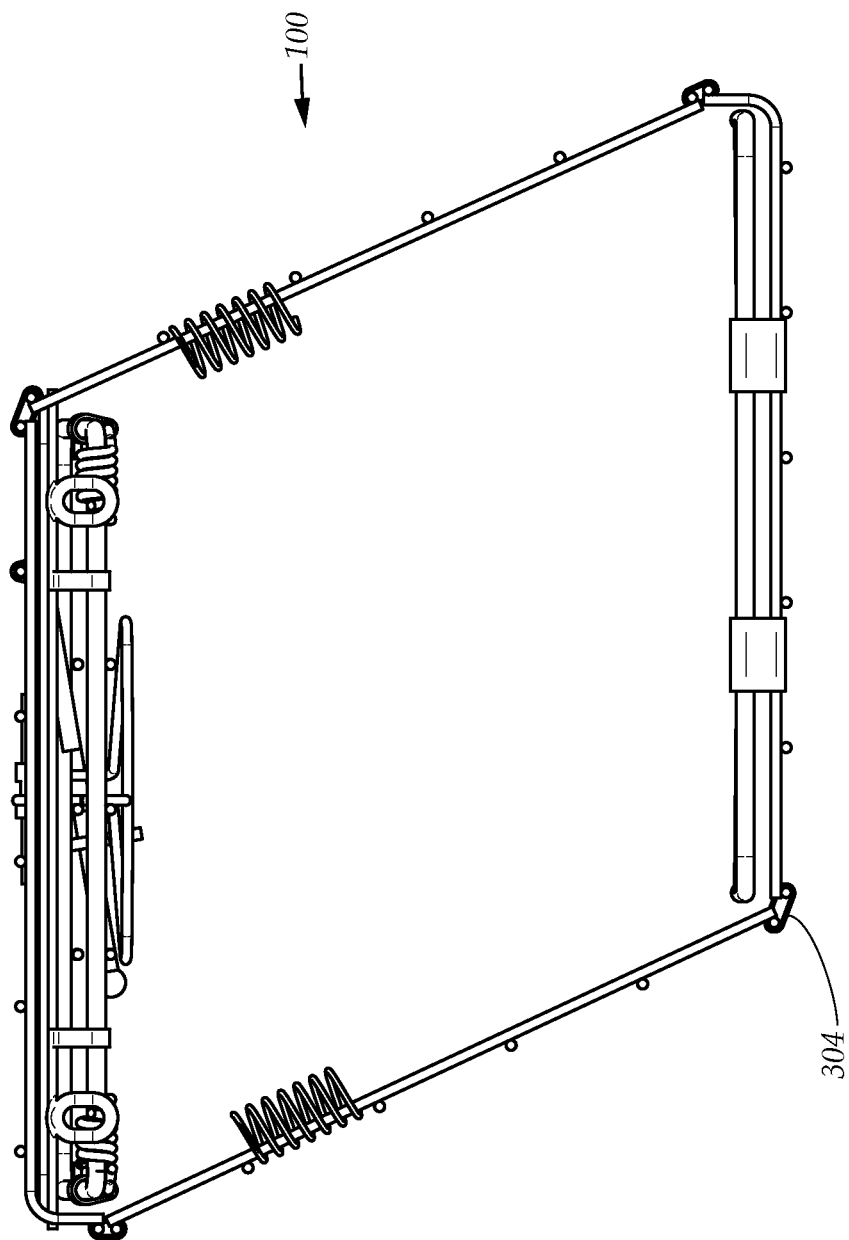
FIG. 5 is a side elevational view showing an example embodiment of the collapsible swim-through trap, wherein the trap is in a partially unfolded position.
Figure 6:
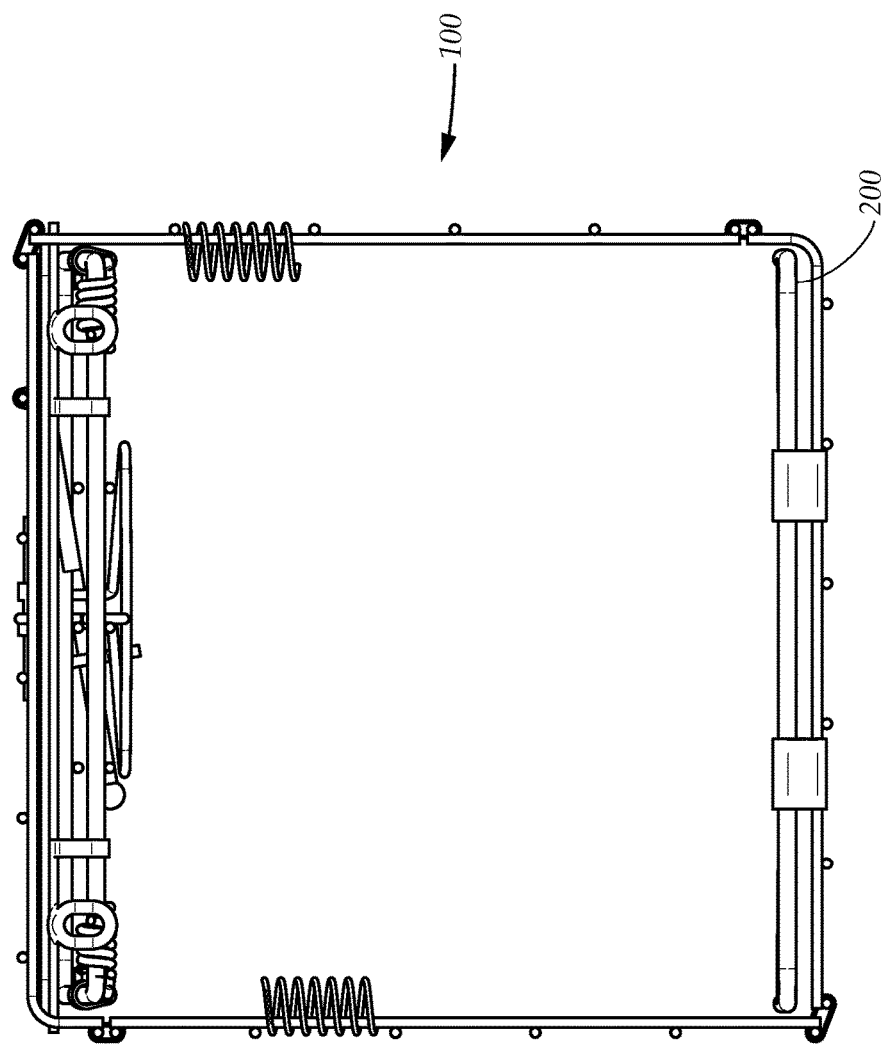
FIG. 6 is a side elevational view showing an example embodiment of the collapsible swim-through trap, wherein the trap is in an unfolded position.

FIGS. 4-6 show a side view of the collapsible swim-through trap according to the present disclosure transitioning from the collapsed position to the open position. Specifically, FIG. 4 shows the case body 100 in a fully collapsed position. Note the position of the left wall 100C, the right wall 100D, the bottom wall 100E, and the top wall 100F in relation to the description of the collapsed position shown above. FIG. 5 shows the cage body 100 in a partially unfolded position with the plurality of body hinges 304 providing the necessary mechanism to unfold the cage body 100 in this manner. FIG. 6 shows the cage body 100 in a completely unfolded, or open position. This is the position the cage body 100 must be in in order for the collapsible swim-through trap according to the present disclosure to operate. Note that while the cage body 100 is in the open position, it will likely not retain this configuration as the position lock mechanism 200 has not been engaged.

Figure 7:
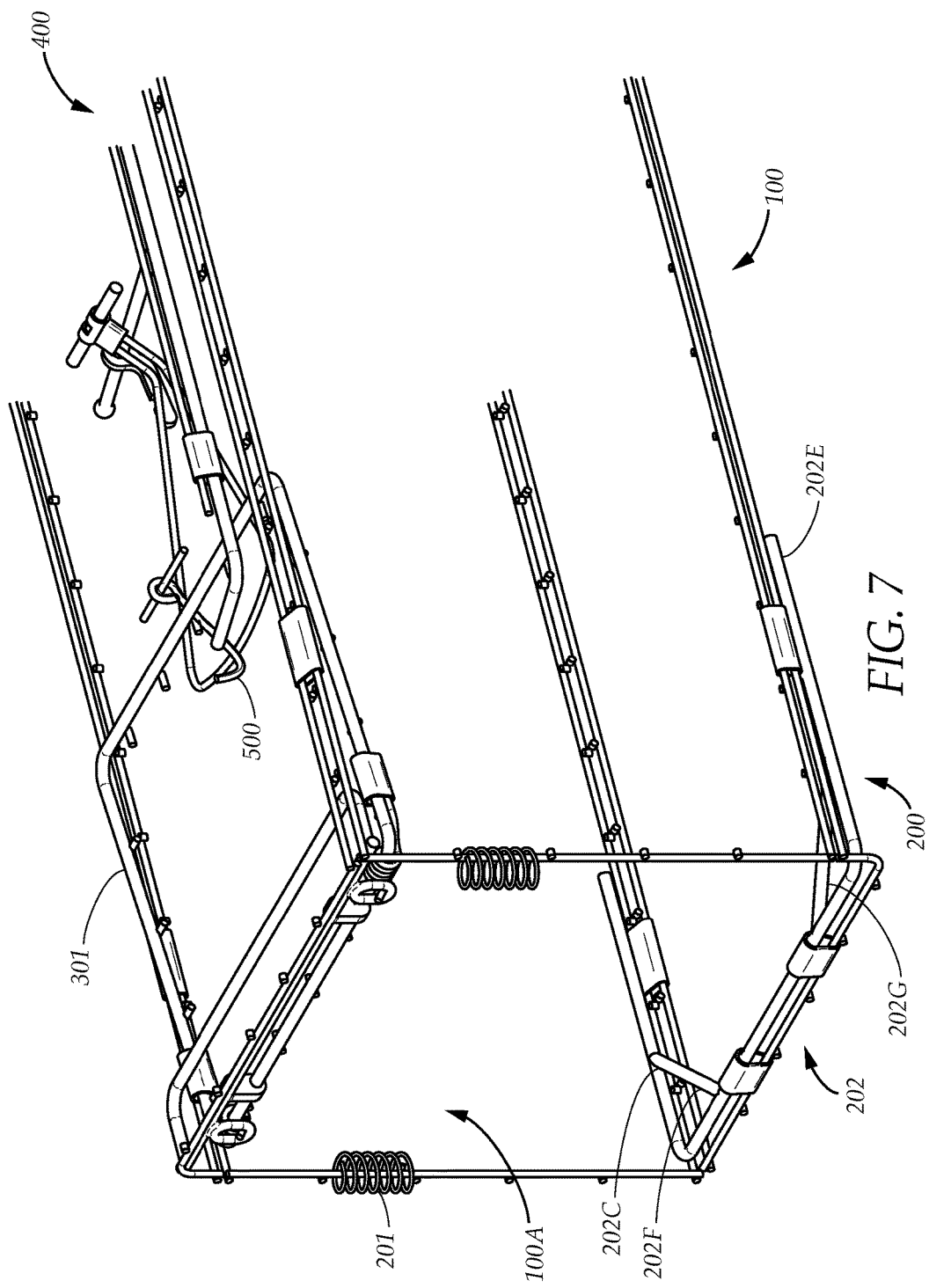
FIG. 7 is a perspective view showing an example embodiment of the collapsible swim-through trap, wherein the trap is unfolded but the position lock mechanism is not engaged, the mesh of the walls being partially omitted.
Figure 8:
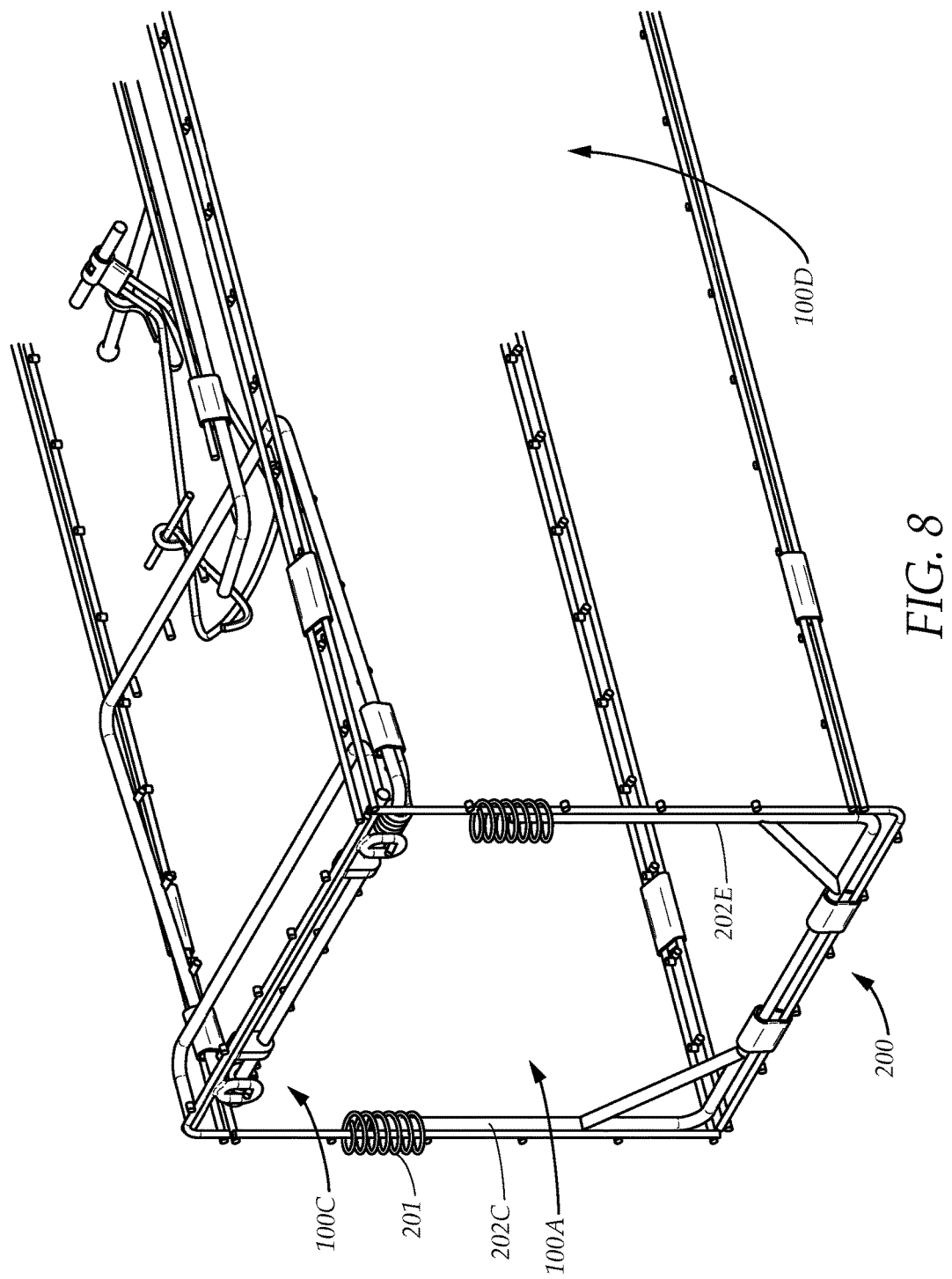
FIG. 8 is a perspective view showing the example embodiment of FIG. 7, with the position lock bar held in position by the two position locks.

FIGS. 7 and 8 show how the position lock mechanism 200 operates. Note that in both FIGS. 7 and 8, large portions of mesh that comprise the cage body 100 have been omitted solely to improve visibility of the components of the position lock mechanism 200 as well as the release mechanism 400. Referring to FIG. 7, the cage body 100 is shown in the open position. To engage the position lock mechanism to retain the cage body in the position a user must grasp the position lock bar 202 and rotate it such that the first vertical portion 202C and the second vertical portion 202E abut against the front opening 100A. When in this position, the first brace 202F and the second brace 202G extend partially across the front opening 100A. In order to facilitate this process, a user may light the first door 301 and have it rest on one of the setting hooks 500. This enables a user to use both hands while engaging the position lock mechanism 200. Once the position lock bar 202 has been rotated into the appropriate position, a user will engage the two position locks 201 to keep the position lock bar 202 in said position, as shown in FIG. 8. Preferably, the position locks 201 are two springs which are vertically mounted, one on the left wall 100C and the other on the right wall 100D. When the position locks 201 are springs, the springs are compressed such that the first vertical portion 202C and the second vertical portion 202E can be inserted into their respective position locks 201. The springs are then allowed to relax, partially encapsulating the first vertical portion 202C and the second vertical portion 202E, effectively fixing the position lock bar 202 into position. When the position lock mechanism 200 is engaged for both the front opening 100A and the rear opening 100B, the cage body is then secured into the open position. Note that while this process is being described in relation to the front opening 100A, the position lock mechanism 200 attached to the rear opening 100B operates in a similar manner.

Figure 9:
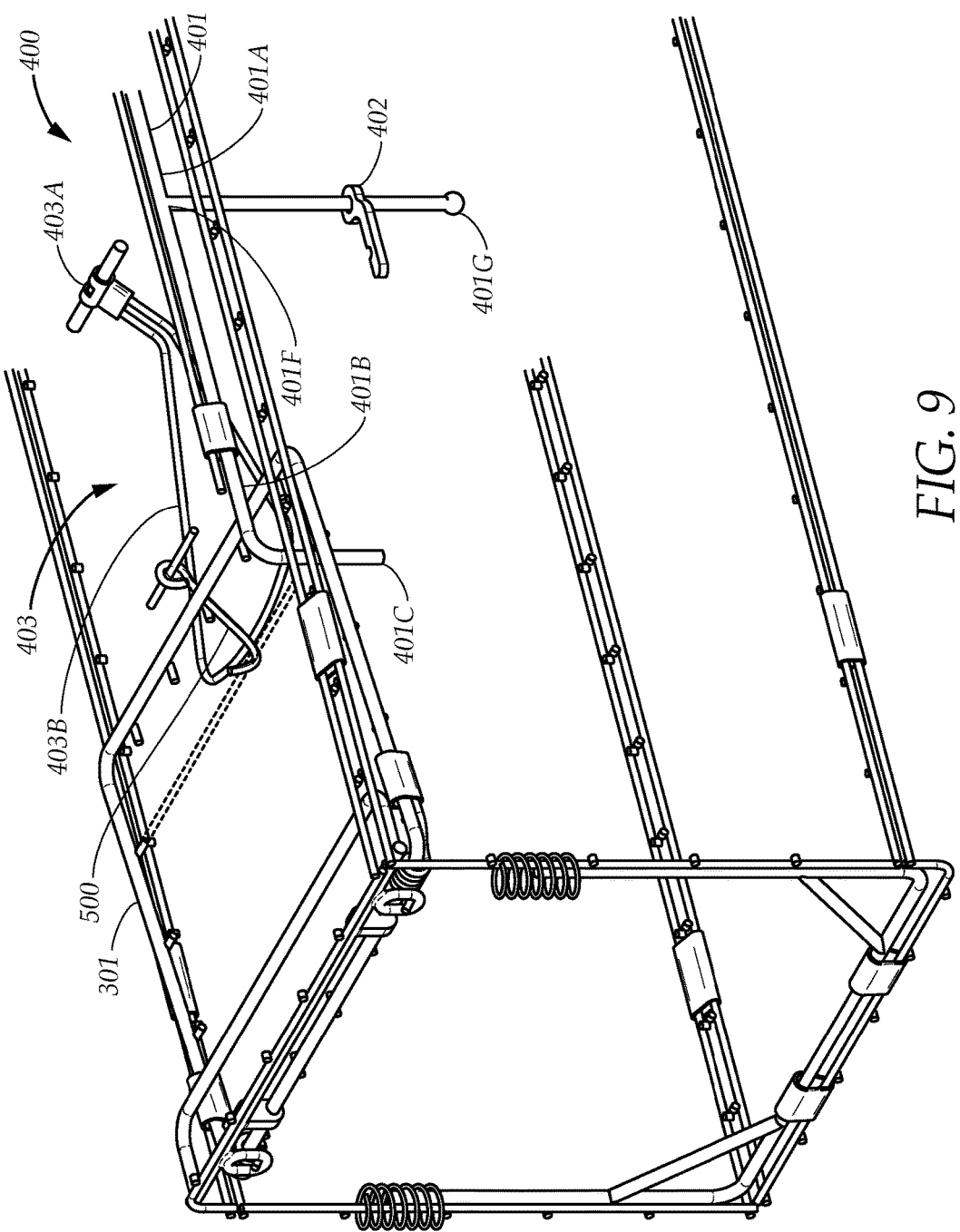
FIG. 9 is a perspective view showing the example embodiment of FIG. 8, wherein the door is held up by one of the setting hooks.

FIGS. 9-12 illustrate the process of setting the trap after the collapsible swim-through trap according to the present disclosure has been secured in the open position. FIG. 9 shows the first door 301 being held up by one setting hook 500, as well as the release mechanism 400. Here the release mechanism 400 includes a door retaining bar 401 having a shaft 401A. The shaft 401A has a first end 401B, a second end 401D (not shown), and a middle 401F therebetween. The first end 401B features a first door retainer 4010 which extends outwardly from the shaft 401A at an angle substantially perpendicular to the shaft 401. The second end 401D (not shown) features a second door retainer 401E (not shown) which extends outwardly from the shaft 401A at an angle substantially perpendicular to the shaft 401. The middle includes a trigger engaging portion 401G which is equipped with a dog 402. The release mechanism 400 also includes a trigger 403 having a trigger clasp 403A and a loop 403B. The trigger clasp 403A is configured to releasably mate with the dog 402.

As can be seen, part of the mesh that the setting hook 500 grabs on to is shown in phantom here. This is to give context to see how the door is being held up, while still maintaining clarity. As mentioned above, this is used to allow the user to more easily set the trap as they will have greater use of their hands by not having to hold the first door 301 up. Also of note here is the position of the door retaining bar 401 in relation to the first door 301. In this position, the door retaining bar 401 cannot hold the first door 301 up, which is why the setting hook 500 is needed.

Figure 3:
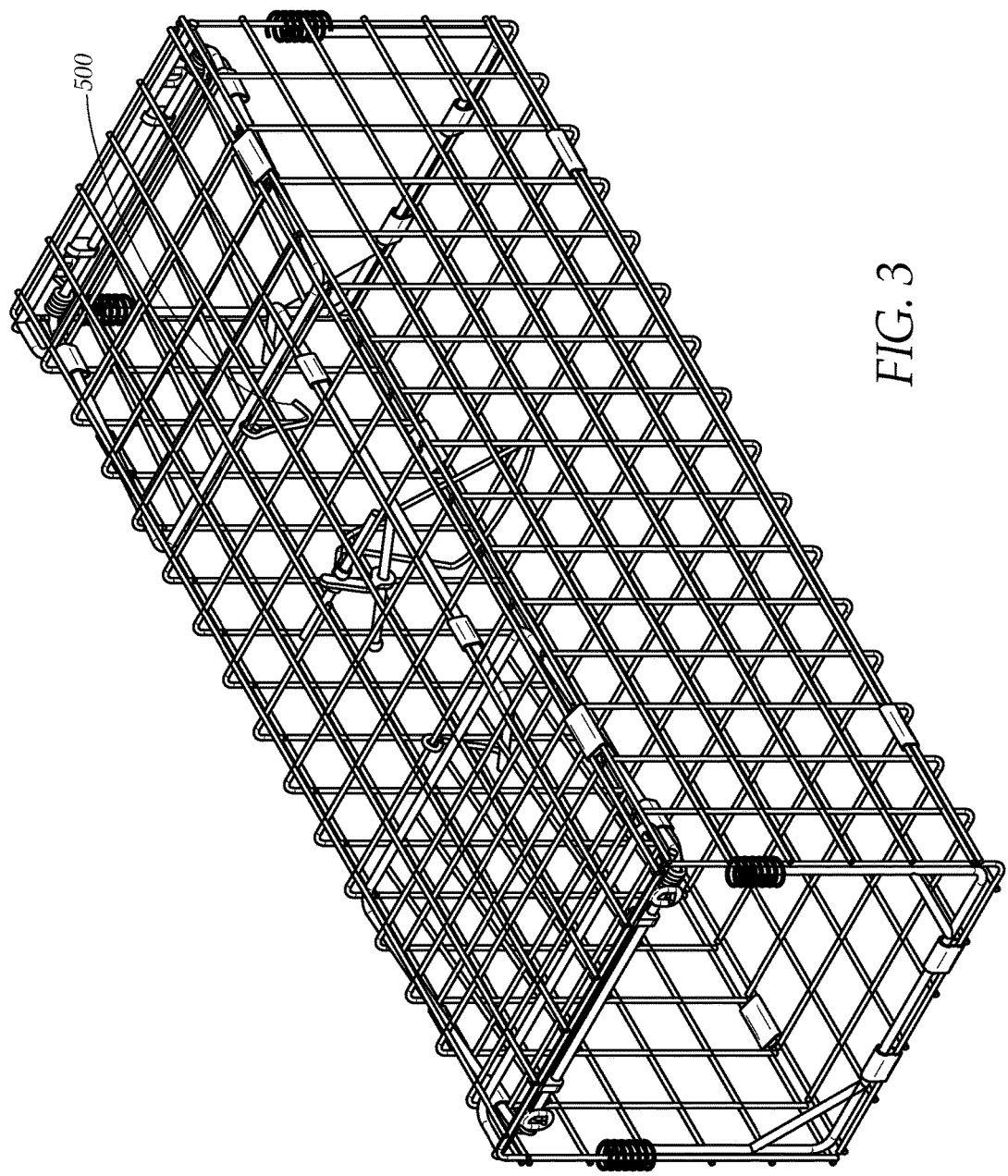
FIG. 3 is a perspective view showing an example embodiment of the collapsible swim-through trap, wherein the trap is set.
Figure 10:
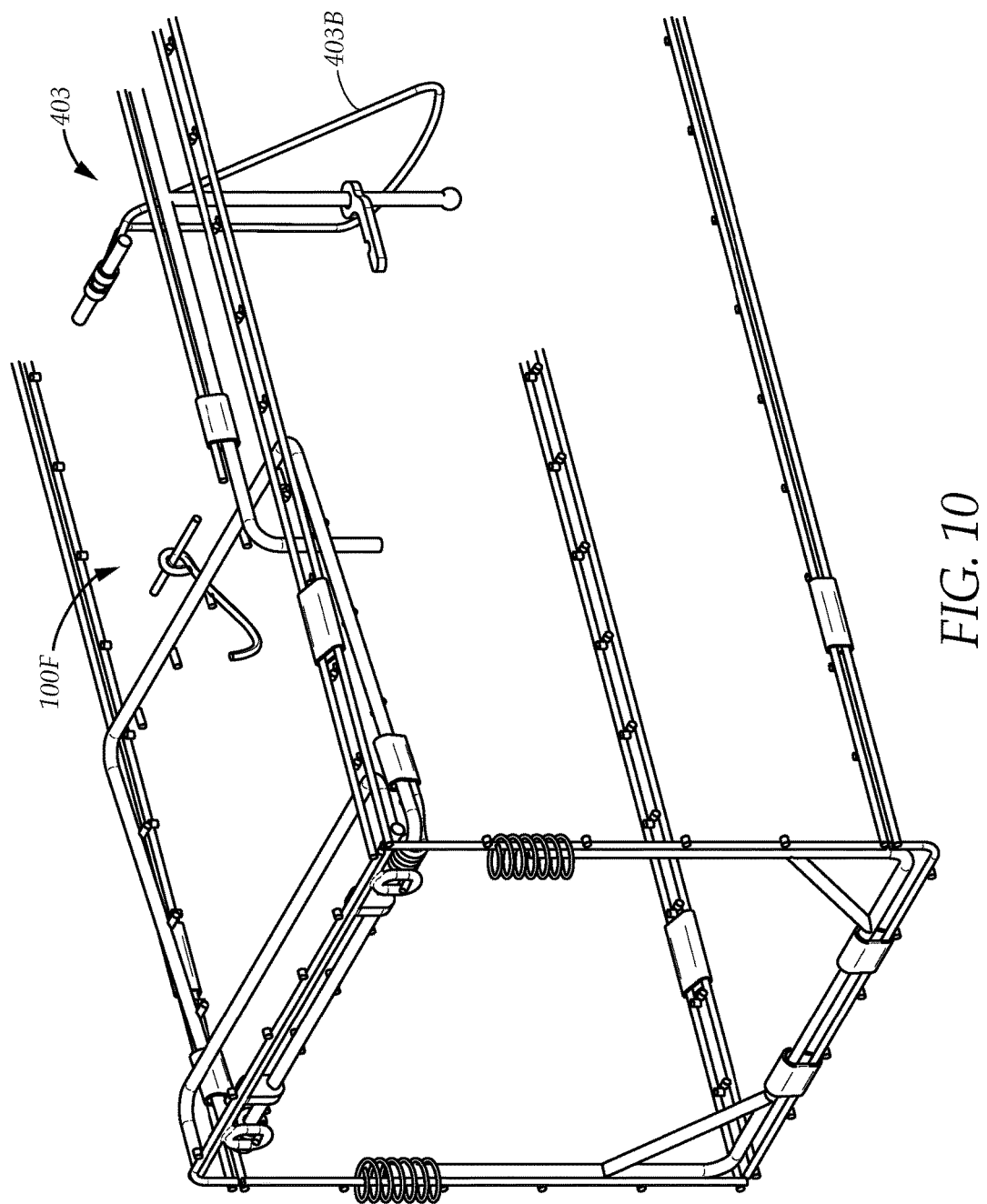
FIG. 10 is a perspective view showing the example embodiment of FIG. 9, wherein the trigger is folded down.
Figure 11:
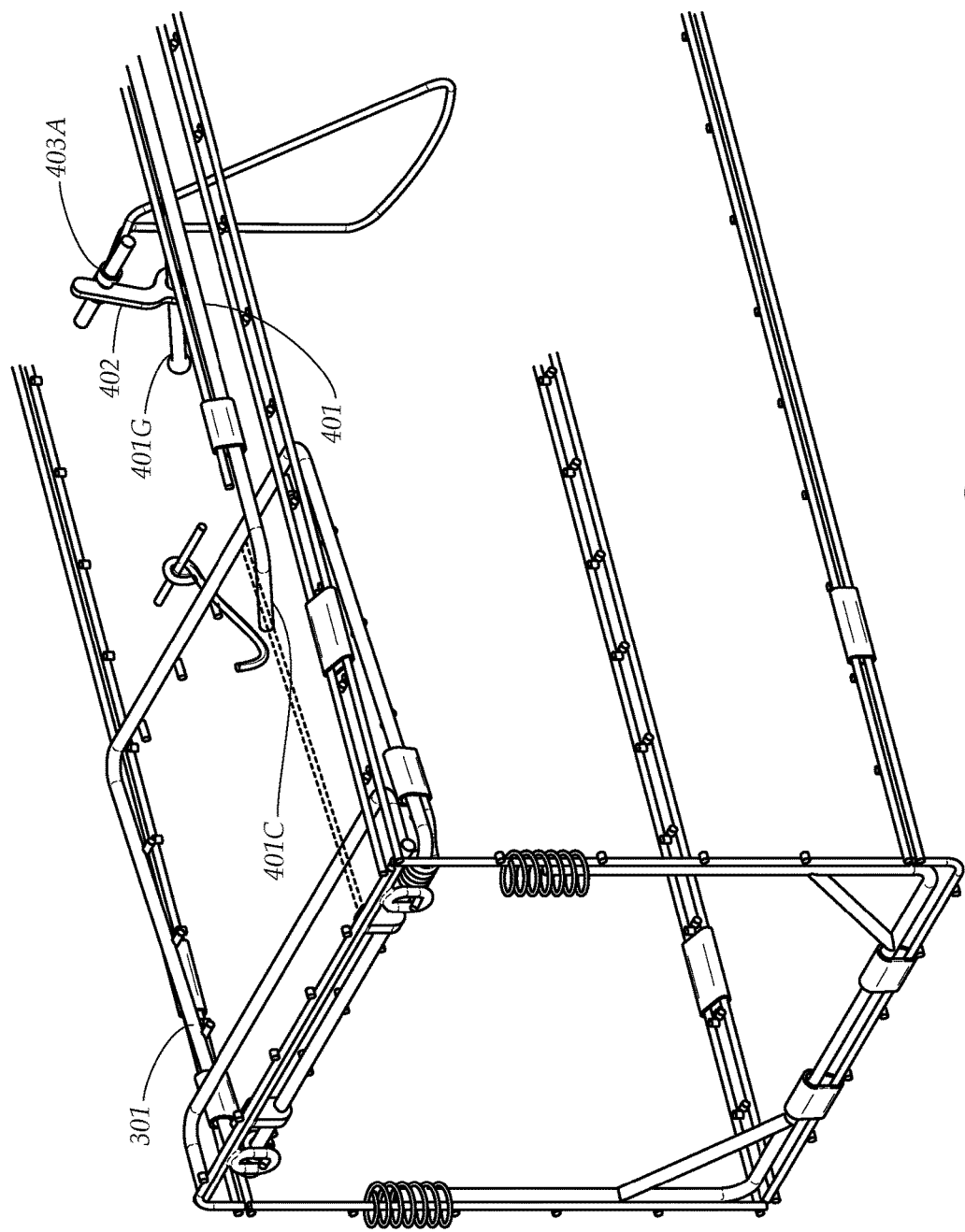
FIG. 11 is a perspective view showing the example embodiment of FIG. 10, wherein the door retaining bar is rotated such that the dog interfaces with the trigger clasp, holding the trap in a set position, with the door still supported by the setting hook.
Figure 12:
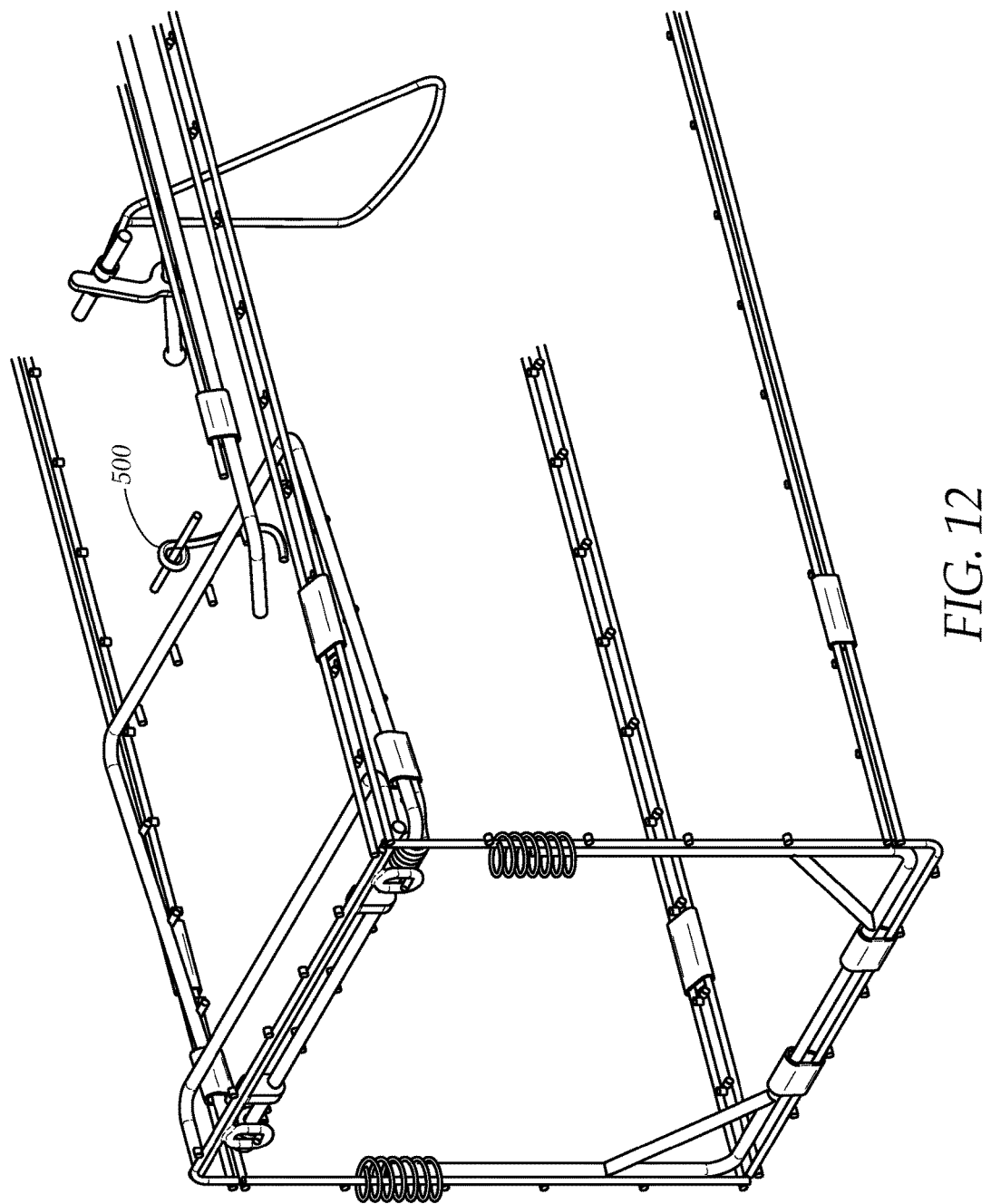
FIG. 12 is a perspective view showing the example embodiment of FIG. 11, wherein the door retaining bar is rotated such that the dog interfaces with the trigger clasp, holding the trap in a set position.

In FIG. 10, the next step of setting the collapsible swim-through trap according to the present disclosure is shown. Specifically, the trigger 403 is rotated such that the loop 403B is no longer proximate to the top wall 100F. Turning to FIG. 11, the door retaining bar 401 is rotated such that the first door retainer 4010 is in contact with the first door 301. Again one of the mesh wires is shown in phantom to give context as to how the first door retainer 4010 holds up the first door 301. By virtue of the door retaining bar 401 being in that position, the trigger engaging portion 401G and the dog 402 are also rotating into the appropriate position. That is, the dog 402 becomes releasably mated with the trigger clasp 403A, effectively setting the collapsible swim-through trap according to the present disclosure. As this point, as shown in FIG. 12, the setting hook 500 is released and the collapsible swim-through trap according to the present disclosure is ready to trap an animal. A complete picture of collapsible swim-through trap according to the present disclosure after being set is shown in FIG. 3. Note the relaxed position of the setting hooks 500 there. Also note that while this description was given in the context of the front opening 100A and the first door 301, the rear opening 100B and the second door 302 operate in an identical manner to what is described above.

Figure 13:
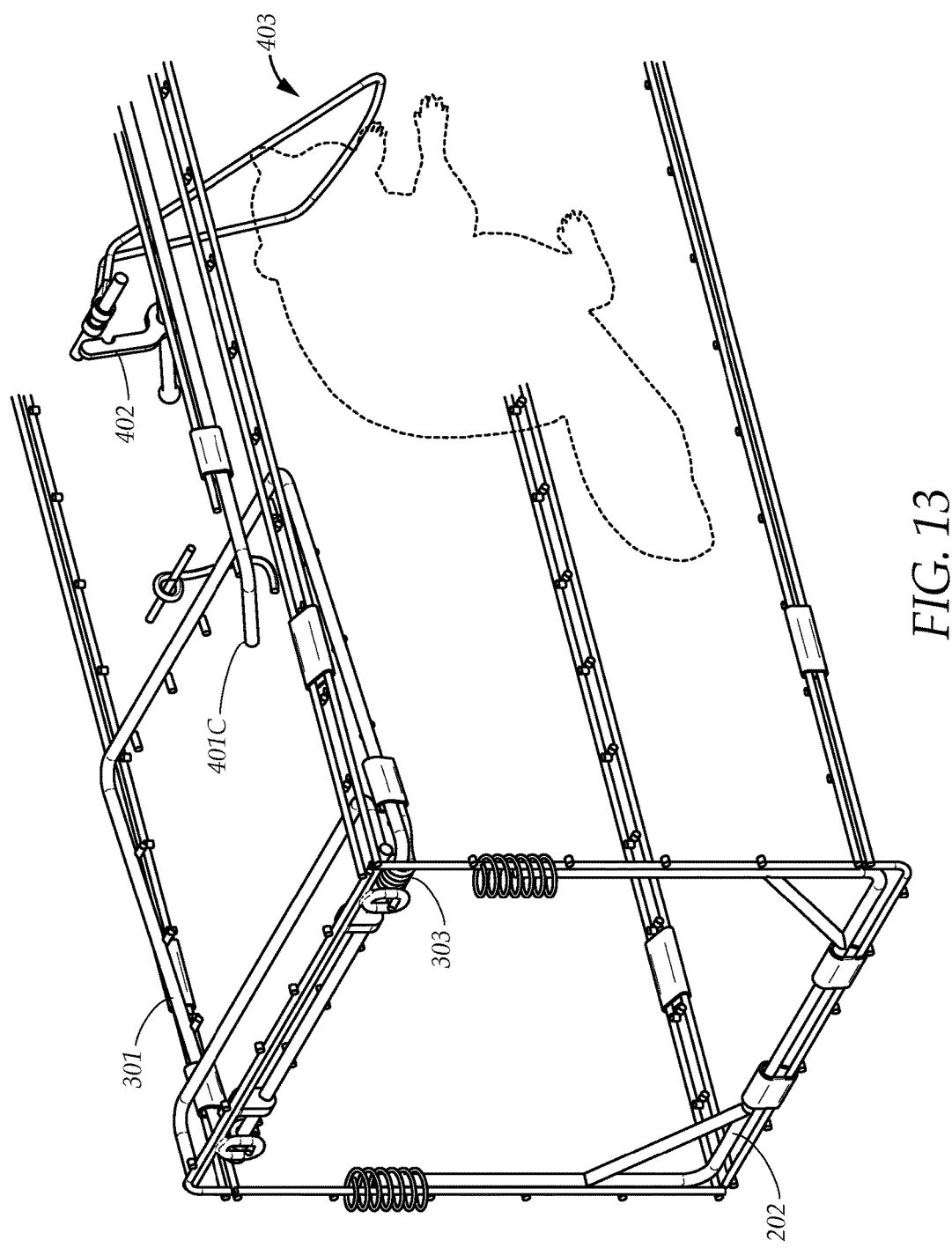
FIG. 13 is a perspective view showing the example embodiment of FIG. 12, wherein an animal is pushing the trigger, causing the trap to spring.
Figure 14:
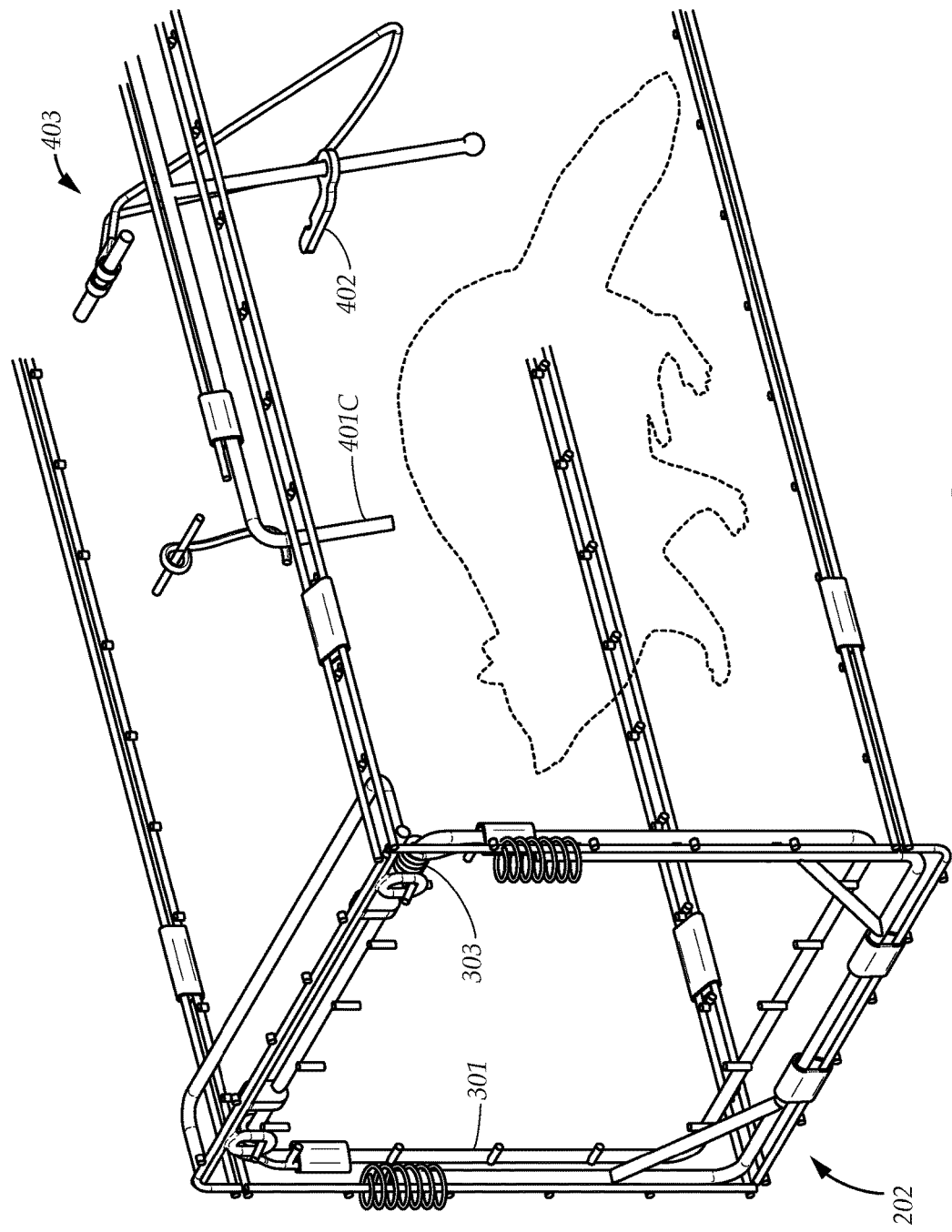
FIG. 14 is a perspective view showing the example embodiment of FIG. 13, with an animal trapped by the trap.

The process of springing the trap is illustrated by FIG. 13, where an animal, shown in phantom, is displayed pushing the trigger 403. The pushing of the trigger 403 causes the trigger clasp 403A to be released from the dog 402, allowing the door retaining bar 401 to return to its natural position, with the first door retainer 4010 facing the ground. By the first door retainer 4010 breaking contact with the first door 301, the plurality of torsion springs 303 cause the first door 301 to snap shut against the position lock bar 202, trapping the animal inside the collapsible swim-through trap according to the present disclosure, as shown in FIG. 14.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a collapsible swim-through trap. The disclosure is illustrated by example in the drawing figures, and throughout the written description. It should be understood that numerous variations are possible, while adhering to the inventive concept. Such variations are contemplated as being a part of the present disclosure.

What is claimed is:
1. A collapsible swim-through trap for trapping an animal that swims therethrough, and for allowing a user to set up and collapse the swim-through trap without any external tools, the collapsible swim-through trap comprising:
a cage body having a front opening, a rear opening, the cage body having a left wall, right wall, bottom wall, and top wall all extending between the front and rear openings, and a first door hingably having a spring bias, the first door being attached to the top wall, proximate to the front opening;

a second door hingably attached to the top wall, proximate to the rear opening;

a first position lock mechanism, having a first position lock bar with a horizontal portion having a left end and a right end, a first vertical portion extending outwardly from the left end, a second vertical portion extending outwardly from the right end, a first brace extending between the first vertical portion and the horizontal portion, and a second brace extending between the second vertical portion and the horizontal portion, the first position lock bar being hingably attached to the bottom wall proximate to the front opening, and a first position lock fixed to the left wall proximate to the front opening, and a second position lock fixed to the right wall proximate to the front opening, wherein the first and second position locks are configured to selectively engage with the first position lock bar;

a second position lock mechanism, having a second position lock bar with a horizontal portion having a left end and a right end, a first vertical portion extending outwardly from the left end, a second vertical portion extending outwardly from the right end, a first brace extending between the first vertical portion and the horizontal portion, and a second brace extending between the second vertical portion and the horizontal portion, the second position lock bar being hingably attached to the bottom wall proximate to the rear opening, and a third position lock fixed to the left wall proximate to the rear opening, and a fourth position lock fixed to the right wall proximate to the rear opening, wherein the third and fourth position locks are configured to selectively engage with the second position lock bar.

2. The collapsible swim-through trap of claim 1, wherein the first door being sized to correspond to the front opening; the second door being sized to correspond to the rear opening, both the first door and the second door being spring biased via a plurality of torsion springs.

3. The collapsible swim-through trap of claim 2, wherein the plurality of torsion springs result in the first door abutting against the first position lock bar and the second door abutting against the second position lock bar.

4. The collapsible swim-through trap of claim 3, further comprising a release mechanism having a door retaining bar having a shaft with a first end, a second end, and a middle portion, the first end being equipped with a first door retainer extending perpendicularly from the shaft, the second end being equipped with a second door retainer extending perpendicularly from the shaft, the middle portion being equipped with a trigger engaging portion having a dog disposed thereon.

5. The collapsible swim-through trap of claim 4, further comprising a trigger rotatably attached to the top wall, the trigger having a clasp and a loop attached to and extending downwardly from the clasp, wherein the dog is configured to releasably mate with the clasp.

6. The collapsible swim-through trap of claim 5, wherein the left wall, right wall, bottom wall, and top wall all being constructed substantially out of a wire mesh.

7. The collapsible swim-through trap of claim 6, further comprising a plurality of setting hooks hingably attached to the top wall in a position in order to mate with the first and second doors.

8. The collapsible swim-through trap of claim 7, wherein the first position lock, second position lock, third position lock, and fourth position lock are constructed out of a spring.

9. The collapsible swim-through trap of claim 8, wherein the first door retainer and the second door retainer are capable of supporting the first door and the second door respectively, wherein the first door retainer and the second door retainer interface with the wire mesh.

10. A method of setting a collapsible swim-through trap, the collapsible swim-through trap for trapping an animal that swims therethrough, and for allowing a user to set up and collapse the swim-through trap without any external tools, the collapsible swim-through trap comprising: a cage body having a front opening, a rear opening, the cage body having a left wall, right wall, bottom wall, and top wall all extending between the front and rear openings, a first door hingably having a spring bias, the first door being attached to the top wall, proximate to the front opening, a second door hingably attached to the top wall, proximate to the rear opening, a first position lock mechanism, having a first position lock bar with a horizontal portion having a left end and a right end, a first vertical portion extending outwardly from the left end, a second vertical portion extending outwardly from the right end, a first brace extending between the first vertical portion and the horizontal portion, and a second brace extending between the second vertical portion and the horizontal portion, the first position lock bar being hingably attached to the bottom wall proximate to the front opening, and a first position lock fixed to the left wall proximate to the front opening, and a second position lock fixed to the right wall proximate to the front opening, wherein the first and second position locks are configured to selectively engage with the first position lock bar, a second position lock mechanism, having a second position lock bar with a horizontal portion having a left end and a right end, a first vertical portion extending outwardly from the left end, a second vertical portion extending outwardly from the right end, a first brace extending between the first vertical portion and the horizontal portion, and a second brace extending between the second vertical portion and the horizontal portion, the second position lock bar being hingably attached to the bottom wall proximate to the rear opening, and a third position lock fixed to the left wall proximate to the rear opening, and a fourth position lock fixed to the right wall proximate to the rear opening, wherein the third and fourth position locks are configured to selectively engage with the second position lock bar, wherein the first door being sized to correspond to the front opening; the second door being sized to correspond to the rear opening, both the first door and the second door being spring biased via a plurality of torsion springs, wherein the plurality of torsion springs result in the first door abutting against the first position lock bar and the second door abutting against the second position lock bar, the method comprising the steps of:

a. placing the collapsible swim-through trap in a desired location, the trap being in a collapsed position;

b. orienting the cage body such that the front opening and the rear opening are substantially rectangular in shape;

c. rotating the first and second position lock bars such that they abut against the left wall and the right wall; and d. mating the first position lock bar with the first and second position lock, and the second position lock bar with the third and fourth position lock.

11. The method of claim 10, the collapsible swim through trap further comprising, a release mechanism having a door retaining bar having a shaft with a first end, a second end, and a middle portion, the first end being equipped with a first door retainer extending perpendicularly from the shaft, the second end being equipped with a second door retainer extending perpendicularly from the shaft, the middle portion being equipped with a trigger engaging portion having a dog disposed thereon, and a trigger rotatably attached to the top wall, the trigger having a clasp and a loop attached to and extending downwardly from the clasp, wherein the dog is configured to releasably mate with the clasp, the method further comprising the steps of:

a. rotating the first and second door towards the top wall;

b. inserting the first door into one setting hook and second door into another setting hook; and c. rotating the door retaining bar such that the first door retainer penetrates the first door, the second door retainer penetrates the second door; and the dog is releasably attached to the trigger clasp.

\* \* \* \* \*